March 20, 1956  J. J. SPICER, JR  2,739,196
TURN SIGNAL SWITCH
Filed July 9, 1952  2 Sheets-Sheet 1
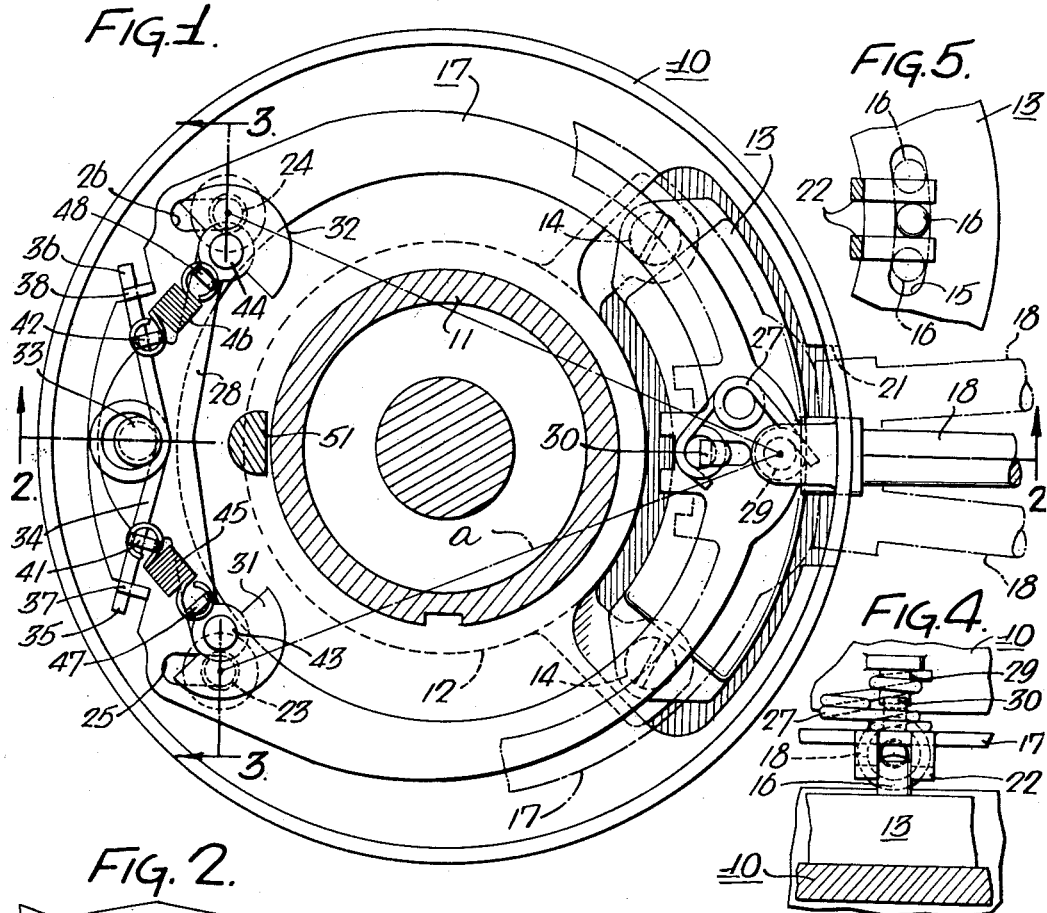
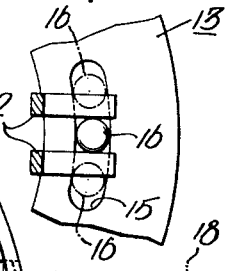
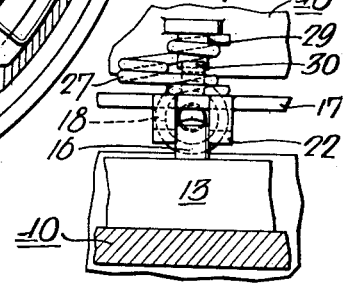
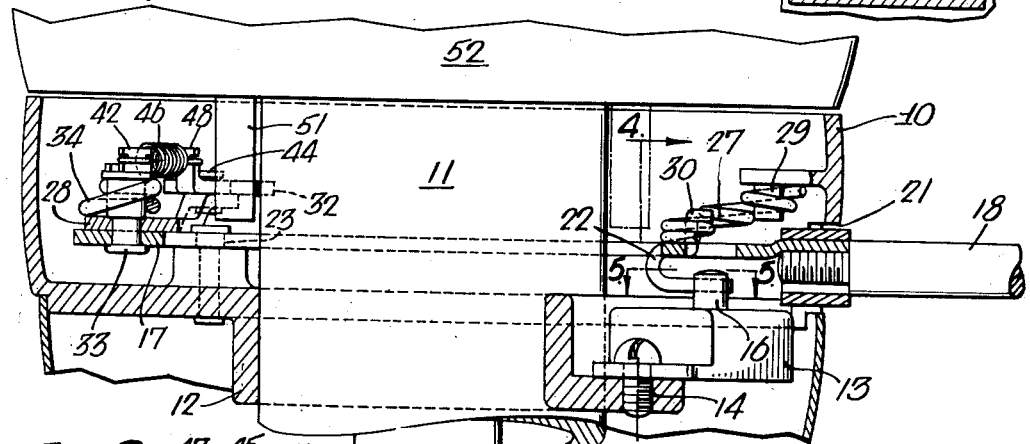
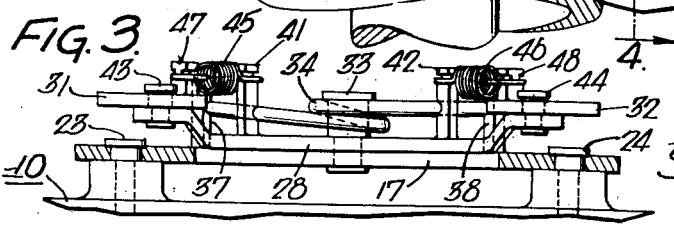
Inventor:
John J. Spicer, Jr.
by his Attorneys
Howson & Howson March 20, 1956  J. J. SPICER, JR  2,739,196
TURN SIGNAL SWITCH
Filed July 9, 1952  2 Sheets—Sheet 2
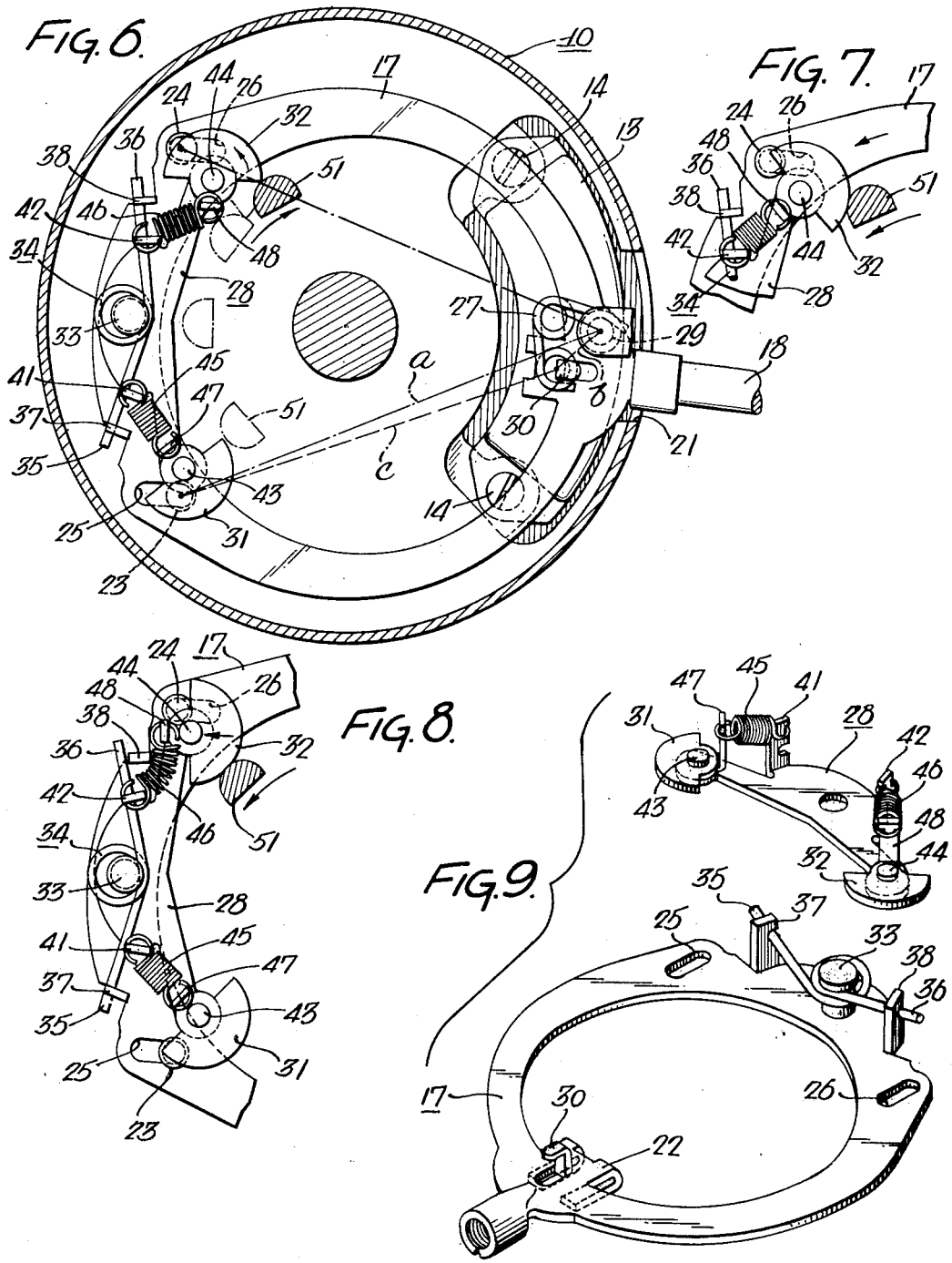
Inventor:
John J. Spicer, Jr.
by his Attorneys
Howson & Howson _United States Patent Office_

2,739,196
Patented Mar. 20, 1956

2,739,196

TURN SIGNAL SWITCH

John J. Spicer, Jr., Philadelphia, Pa., assignor to United Specialties Company, Philadelphia, Pa., a corporation of Delaware Application July 9, 1952, Serial No. 297,911

14 Claims. (Cl. 200—61.34)

The present invention relates to new and useful improvements in switch mechanisms adapted for use in conjunction with direction indicating signal systems for automobiles and like vehicles, and more particularly to improvements in switch mechanisms wherein the direction signal is set manually prior to making a turn, remains set while the turn is being made, and is automatically cancelled upon the resumption of a straight course after the turn has been made.

The principal object of the present invention is to provide novel switch mechanism of the type described wherein the switch actuating member may be manually pivoted from a neutral position to operative positions at opposite sides of the neutral position about separate pivot points at such opposite sides of the neutral position to provide a more positive action to the switch actuating member.

Another object of the present invention is to provide novel directional signal switch mechanism which is yieldably maintained in the "on" positions so that jamming of the switch mechanism in an "on" position will not interfere with the turning of the vehicle.

A further object of the present invention is to provide a novel directional signal switch mechanism which is of relatively compact construction and capable of being installed readily on automobiles or like vehicles.

A still further object of the present invention is to provide a novel directional signal switch mechanism of the above mentioned type having the features and characteristics set forth which is of relatively simplified construction and entirely efficient and effective in operation and use.

These and other objects of the present invention and the various features and details of the operation and construction thereof are hereinafter more fully set forth and described with reference to the accompanying drawings, in which:

Fig. 1 is an enlarged plan view partially in section of a turn signal switch made in accordance with the present invention;

Fig. 2 is a transverse sectional view taken on line 2—2, Fig. 1 illustrating the turn signal switch of the present invention installed on an automobile steering column;

Fig. 3 is a fragmentary sectional view taken on line 3—3, Fig. 1 illustrating the construction and method of support of the switch actuating ring and cancelling elements;

Fig. 4 is a fragmentary sectional view taken on line 4—4, Fig. 2 illustrating the detent means for maintaining the switch actuating ring in its neutral and "on" positions;

Fig. 5 is a fragmentary plan view taken on line 5—5, Fig. 2 illustrating the method of connecting the switch actuating ring to the electric switch element;

Fig. 6 is a plan view similar to Fig. 1 illustrating the switch mechanism in a position indicating a right hand turn;

Fig. 7 is a fragmentary plan view similar to Fig. 6 illustrating cancelling of the switch mechanism upon counterclockwise rotation of the steering wheel;

Fig. 8 is a fragmentary plan view of the switch mechanism in the position shown in Fig. 6 illustrating the resilient mounting of the switch mechanism; and Fig. 9 is an exploded perspective view of the switch actuating ring and the mounting plate which carries the cancelling elements.

Referring more specifically to the drawings and particularly Fig. 1 thereof, reference numeral 10 designates generally a housing for the switch mechanism which is adapted to be secured to the steering column or post 11 of an automobile or like vehicle and positioned concentrically thereabout. A ring 12 formed as an integral part of the housing 10 is provided to encircle the steering column 11 and be fixedly secured thereto in order to support the housing in the desired position with respect to the steering column. The ring 12 may be secured to the steering column 11 in any desired manner, for example, it may be bolted directly to the steering column by means of bolts, not shown.

Positioned inwardly of the housing 10 in spaced relationship from the side wall thereof is an electric switch 13 operable selectively to actuate the directional signal lights of an automobile or like vehicle. The switch 13 is secured to the housing 10 by suitable means, for example, bolts 14. The upper surface of the housing of the switch 13 is provided with an arcuate slot 15 through which a lug 16 extends. The lug 16 is carried by a switch contact member (not shown) and is slidable in the arcuate slot 15 within predetermined limit positions, indicated in broken lines in Fig. 5, and operates the switch 13. When the lug 16 is in the central position, as shown in Fig. 5, the circuit to the directional signal lights is open. Moving the lug to the upper limit position with respect to Fig. 5, which position would be the counter-clockwise limit position with respect to Fig. 1, will energize the left hand directional signal lights. Similarly, moving the lug to the downward or lower limit position with respect to Fig. 5, which position would be the clockwise limit position with respect to Fig. 1, will close the circuit to the right hand directional signal lights. These counter-clockwise and clockwise limit positions will be designated as left and right hand limit positions to indicate left and right hand turns, respectively.

Referring now to the switch operating mechanism, a switch actuating ring or positioning ring 17 of generally circular shape is provided inwardly of the housing 10 encircling the steering column 11 and is adapted to be pivoted from a neutral "off" position to right and left hand "on" positions at opposite sides of the neutral position to actuate the switch 13. The positioning ring 17 has an operating lever 18 fixedly secured thereto at a point directly above electric switch 13. The operating lever 18 extends outwardly of the housing 10 through an opening or elongated slot 21 to permit the positioning ring 17 to be manually actuated by the driver of the vehicle. Extending downwardly from the lower surface of the positioning ring at a point adjacent the connection of the positioning ring to the operating lever is a bifurcated finger or projection 22 which engages opposite sides of the lug 16 and causes actuation of the lug and contact plate of the electric switch 13 upon actuation of the positioning ring.

In accordance with the present invention, to insure easier and more positive movement of the positioning ring, the ring 17 is adapted to be pivoted about separate pivot points when the ring is moved from its neutral position to the right or left hand limit positions. The two pivot points are formed by pins 23 and 24, respectively, which are secured to the base of the housing 10 and project upwardly therefrom for engagement by the ring 17. The pins 23 and 24 are equally spaced on opposite sides of a pivot diametrically opposite the neutral position of the switch 13, and the pin 23 serves as the pivot point for the positioning ring when the ring is actuated in one direction to indicate a right hand turn while the pin 24 serves as the pivot point for the positioning ring when the ring is actuated in the opposite direction to indicate a left hand turn.

An important feature of the present invention is the mounting of the positioning ring on the pins 23 and 24 so that the positioning ring will engage both of the pins 23 and 24 in the neutral position but will pivot about the pin 23 upon actuation to the right hand turn limit position and about the pin 24 upon actuation to the left hand turn limit position. To accomplish this, a pair of arcuate slots 25 and 26 are provided in the portion of the ring opposite the connection to the operating lever 18 which receive the pins 23 and 24, respectively. The arcuate slot 25 is formed so that its center of curvature will be coincident with the pin 24 when the ring is in position on the pins 23 and 24. Similarly, the arcuate slot 26 is formed with a center of curvature coincident with the pin 23 when the positioning ring is mounted in the housing. By this construction the positioning ring may be readily pivoted about the pins 23 or 24 selectively and the limit position of the positioning ring will be determined by engagement of the pin not used as the pivot point with the end of its associated slot.

As illustrated in Fig. 1, when the positioning ring is in its neutral or "off" position the pins 23 and 24 engage the ends of the slots 25 and 26, respectively, which are closest to the switch 13. The positioning ring is resiliently maintained in this position by means of a compression spring 27 which has its opposite ends connected to and reacting against the positioning ring 17 and the housing 10. With reference to Fig. 2, the opposite ends of the compression spring 27 are connected respectively to a lug 30 displaced upwardly from the positioning ring and a finger 29 projecting outwardly from the housing 10 above the center portion of the switch 13. The compression or torsion spring 27, in addition to maintaining the positioning ring 17 in its neutral position with respect to the pins 23 and 24, also serves a dual purpose as a detent spring and resiliently maintains the positioning ring in the right and left hand "on" positions.

In Fig. 6 the compression spring 27 is illustrated as resiliently maintaining the positioning ring in the right hand limit position in order to prevent the directional signal switch mechanism from being accidentally or inadvertently cancelled. The broken line, designated generally as $a$ is drawn interconnecting the center of the right hand pivot point with the end of the detent spring 27 which is secured to the housing 10 while the dotted lines $b$ and $c$ are drawn interconnecting, respectively, the two ends of the compression spring 27 and the end of the compression spring which is secured to the positioning ring and the right hand pivot point. As shown in the drawings, the lines $a$, $b$ and $c$ form a triangle with the line $a$ as a base. The end of the compression spring secured to the positioning ring must cross the line $a$ upon movement from the neutral position to the right hand limit position and vice versa. Accordingly, it is readily apparent that the spring 27 is compressed the greatest amount when the end of the spring secured to the positioning ring crosses the line $a$ and thus it will be observed that the compression spring resiliently maintains the positioning ring in its neutral position and limit positions.

Another equally important feature of the present invention is the provision of a mounting plate 28 pivotally secured to the positioning ring 17 at a point diametrically opposite the switch 13 and adapted to carry a pair of cancelling elements 31 and 32. As illustrated in Figs. 1 and 2, the mounting plate 28 is pivotally mounted at its midpoint to a pin 33 which extends upwardly from the positioning ring 17 and is adapted to be pivoted in either direction about the pin 33. A coil spring 34 is provided to maintain the mounting plate 28 in a neutral or central position with respect to the positioning ring 17. The spring 34 includes a portion coiled about the pin 33 and is provided with elongated end portions 35 and 36 which are maintained in a biased position by lugs 37 and 38 respectively projecting upwardly from the positioning ring 17. A pair of upwardly extending projections 41 and 42 formed as integral parts of the mounting plate 28 and equally positioned thereon at opposite sides of the pin 33 engage the elongated end portions 35 and 36, respectively, of the spring and resiliently maintain the mounting plate 28 in the central position. As more fully described hereinafter, the mounting plate 28 may be rotated about the pin 33 against the pressure of the spring 34 to prevent the switch mechanism from interfering with rotation of the steering wheel if the switch mechanism becomes jammed in the "on" position.

At each side of the mounting plate 28 equi-distant from the pin 33 are the cancelling elements 31 and 32 which are rotatably mounted on pins 43 and 44, respectively. The cancelling elements 31 and 32 are generally semi-circular in shape and have their arcuate or rounded surface projecting outwardly away from the ends of the plate 28. A pair of coil springs 45 and 46 are provided which interconnect the upwardly extending projections 41 and 42 on the mounting plate with projections 47 and 48, respectively, on the inner surface of the cancelling elements 31 and 32 and resiliently maintain the cancelling elements in the described position.

In the neutral or "off" position of the directional signal switch mechanism a lug 51 secured to and rotatable with the hub 52 of a steering wheel is adapted to be rotated freely with the hub of the steering wheel without engaging the cancelling elements. Upon actuation of the switch to indicate a right hand turn, as shown in Figs. 6, 7 and 8, the one cancelling element 32 is projected into the path of travel of the lug 51. As the steering wheel is turned to make a right hand turn with the mechanism in the right hand position, the lug 51 contacts the flat portion of the cancelling element 32 and causes the element 32 to rotate against the pressure of the coil spring 46, as shown in Fig. 6. Thus, the lug 51 may be rotated with the steering wheel in the clockwise or right hand direction without altering the position of the positioning ring when the switch mechanism is actuated to indicate a right hand turn.

After the right hand turn has been made and the vehicle straightened out by counter-clockwise rotation of the steering wheel, the lug 51 will contact the cancelling element 32 as shown in Fig. 7, and force the positioning ring 17 and its associated parts to the neutral position thereby automatically discontinuing the signal and resetting the switch for further use. During the return motion of the steering wheel, the lug 51 contacts the semi-circular surface of the cancelling element 32 and exerts a force thereon toward the center of the cancelling element and rotates the positioning ring 17 about the pin 23 to the neutral position. In this respect it should be pointed out that the force exerted on the cancelling element 32 is transmitted entirely to the mounting plate 28 and accordingly, the spring 34 must be stiffer or stronger than the compression spring 27. Also, as previously described, the compression spring 27 must pass an over center position upon movement to or from the limit positions of the ring and accordingly, the compression spring resiliently maintains the ring in the "off" and "on" positions.

Also, by this construction and arrangement of the switch mechanism, it will be seen that with the device set as aforesaid for a right hand turn, should the vehicle be returned to the left in a direction contrary to that indicated by the signal, the initial left hand turning of the steering wheel will operate to quickly cancel the incorrect signal.

Should the ring 17 be jammed or held in the "on" position, when the vehicle is being straightened, the mounting plate 28 will be rotated about the pin 33 against the pressure of the spring 34, as illustrated in Fig. 8, allowing the wheel to turn without interference.

It should be apparent that in the case of setting the directional signal switch mechanism for indicating a left hand turn, the operation of the device is the same as that set forth above except that the opposite cancelling element 31 is involved, and the various operations are effected by movement of the steering wheel in directions opposite to those given for the right hand signal position of the device.

From the foregoing, it will be observed that the present invention provides a novel directional signal switch for automobiles or like vehicles embodying novel features of construction and operation wherein the switch actuating member may be manually pivoted from a central neutral position to operative positions at opposite sides of the neutral position about separate pivot points at such opposite sides of the neutral position to provide a more positive action to the switch actuating member. In addition, it will be observed that the present invention provides a novel directional signal switch which is of relatively simplified construction and entirely efficient and effective in operation and use.

While a particular embodiment of the present invention has been illustrated and described herein, it is not intended to limit the invention to such a disclosure and changes and modifications may be incorporated and embodied therein within the scope of the following claims.

I claim:

1. A directional signal switch for automobiles and like vehicles comprising an electric switch including a member movable between a central "off" position and "on" positions at opposite sides of the "off" position; a ring having a portion overlying the switch member and operatively connected thereto, means pivotally mounting said ring for rotary movement about pivots equally spaced at opposite sides of an imaginary center line through the "off" position of the electric switch, means to manually pivot the ring selectively about the left hand pivot in a right hand direction and about the right hand pivot in a left hand direction to right and left hand "on" positions, a mounting plate resiliently carried by said ring, and a pair of cancelling elements rotatably carried by the mounting plate at respectively opposite sides thereof and arranged when the ring, mounting plate and switch are in either of said "on" positions to be relatively projected for engagement in one direction to effect actuation of the ring, mounting plate and switch to the central "off" position and for engagement in the opposite direction to rotate freely with respect to the ring, mounting plate and switch without actuating the same.

2. A directional signal switch for automobiles and like vehicles comprising an electric switch including a member movable between a central "off" position and "on" positions at opposite sides of the "off" position; a ring having a portion overlying the switch member and operatively connected thereto, means pivotally mounting said ring for rotary movement about a pair of pivots equally spaced at opposite sides of an imaginary center line through the "off" position of the electric switch, means to manually pivot the ring selectively about the left hand pivot in a right hand direction and about the right hand pivot in a left hand direction to right and left hand "on" positions, a mounting plate resiliently carried by said ring, spring means normally urging said mounting plate toward a central limit position with respect to the ring, and a pair of cancelling elements rotatably carried by the mounting plate at respectively opposite sides thereof and arranged when the ring, mounting plate and switch are in either of said "on" positions to be relatively projected for engagement in one direction to effect actuation of the ring, mounting plate and switch to the central "off" position and for engagement in the opposite direction to rotate freely with respect to the ring, mounting plate and switch without actuating the same.

3. A directional signal switch for automobiles and like vehicles comprising an electric switch including a member movable between a central "off" position and "on" positions at opposite sides of the "off" position; a ring having a portion overlying the switch member and operatively connected thereto, means pivotally mounting said ring for rotary movement about a pair of pivots equally spaced at opposite sides of an imaginary center line through the "off" position of the electric switch, means to manually pivot the ring selectively in opposite directions about one of said pivot points to actuate said switch from the "off" position to one of said "on" positions and about the other of said pivot points to the other of said "on" positions, a mounting plate resiliently carried by said ring, and a pair of cancelling elements rotatably carried by the mounting plate at respectively opposite sides thereof and arranged when the ring, mounting plate and switch are in either of said "on" positions to be relatively projected for engagement in one direction to effect actuation of the ring, mounting plate and switch to the central "off" position and for engagement in the opposite direction to rotate freely with respect to the ring, mounting plate and switch without actuating the same.

4. A directional signal switch for automobiles and like vehicles comprising an electric switch including a member movable between a central "off" position and "on" positions at opposite sides of the "off" position; a ring having a portion overlying the switch member and operatively connected thereto, means pivotally mounting said ring for rotary movement about a pair of pivots equally spaced at opposite sides of an imaginary center line through the "off" position of the electric switch, means to manually pivot the ring selectively in opposite directions about one of said pivot points to actuate said switch from the "off" position to one of said "on" positions and about the other of said pivot points to the other of said "on" positions, a mounting plate resiliently carried by said ring, spring means normally urging said mounting plate toward a central limit position with respect to the ring, and a pair of cancelling elements rotatably carried by the mounting plate at respectively opposite sides thereof and arranged when the ring, mounting plate and switch are in either of said "on" positions to be relatively projected for engagement in one direction to effect actuation of the ring, mounting plate and switch to the central "off" position and for engagement in the opposite direction to rotate freely with respect to the ring, mounting plate and switch without actuating the same.

5. A directional signal switch for automobiles and like vehicles comprising a housing mounted about the steering column of the vehicle and an electric switch movable between a central "off" position and "on" positions at opposite sides of said "off" position; a pair of pins secured to said housing, said pins being disposed equally at opposite sides of a point diametrically opposite the "off" position of the electric switch, a ring mounted in engagement with said pins, means to selectively rotate said ring from a central "off" position to a right hand "on" position about one of said pins and to a left hand "on" position about the other of said pins, means interconnecting said ring with the electric switch operable to actuate said switch upon similar actuation of the ring, a mounting plate carried by said ring, and a pair of cancelling elements rotatably mounted on said mounting plate at respectively opposite sides thereof and arranged when the ring, mounting plate and switch are in either of said "on" positions to be relatively projected for engagement in one direction to effect actuation of the ring, mounting plate and switch to the central "off" position and for engagement in the opposite direction to rotate freely with respect to the ring, mounting plate and switch without actuating the same.

6. A directional signal switch for automobiles and like vehicles comprising a housing mounted about the steering column of the vehicle and an electric switch including a member movable between a central "off" position and "on" positions at opposite sides of said "off" position; a pair of pins secured to said housing, said pins being disposed equally at opposite sides of a point diametrically opposite the "off" position of the electric switch, a ring mounted in engagement with said pins and having a portion thereof overlying said electric switch, means to selectively rotate said ring from a central "off" position to a right hand "on" position about the left hand pin and to a left hand "on" position about the right hand pin, means interconnecting said ring with the electric switch operable to actuate said switch upon similar actuation of the ring, a mounting plate resiliently carried by said ring, and a pair of cancelling elements rotatably mounted on said mounting plate at respectively opposite sides thereof and arranged when the ring, mounting plate and switch are in either of said "on" positions to be relatively projected for engagement in one direction to effect actuation of the ring, mounting plate and switch to the central "off" position and for engagement in the opposite direction to rotate freely with respect to the ring, mounting plate and switch without actuating the same.

7. A directional signal switch for automobiles and like vehicles comprising a housing mounted about the steering column of the vehicle and an electrical switch movable between a central "off" position and "on" positions at opposite sides of said "off" position; a pair of pins secured to said housing, said pins being disposed equally at opposite sides of a point diametrically opposite the "off" position of the electric switch, a ring mounted in engagement with said pins, means to selectively rotate said ring from a central "off" position to a right hand "on" position about one of said pins and to a left hand "on" position about the other of said pins, a compression spring engaged between said ring and the housing operable to resiliently maintain the ring in the "off" position and in the right and left hand limit positions, means on said ring in engagement with the electric switch operable to actuate said switch upon similar actuation of the ring, a mounting plate resiliently mounted on said ring, and a pair of cancelling elements rotatably carried by the mounting plate at respectively opposite sides thereof and arranged when the ring, mounting plate and switch are in either of said "on" positions to be relatively projected for engagement in one direction to effect actuation of the ring, mounting plate and switch to the central "off" position and for engagement in the opposite direction to rotate freely with respect to the ring, mounting plate and switch without actuating the same.

8. A directional signal switch for automobiles and like vehicles comprising a housing mounted about the steering column of the vehicle and an electrical switch movable between a central "off" position and "on" positions at opposite sides of said "off" position; a pair of pins secured to said housing, said pins being disposed equally at opposite sides of a point diametrically opposite the "off" position of the electric switch, a ring mounted in engagement with said pins, means to selectively rotate said ring from a central "off" position to a right hand "on" position about one of said pins and to a left hand "on" position about the other of said pins, guide means to direct rotary movement of the ring about said pins, a compression spring engaged between said ring and the housing operable to resiliently maintain the ring in the "off" position and in the right and left hand limit positions, means on said ring in engagement with the electric switch operable to actuate said switch upon similar actuation of the ring, a mounting plate resiliently mounted on said ring, and a pair of cancelling elements rotatably carried by the mounting plate at respectively opposite sides thereof and arranged when the ring, mounting plate and switch are in either of said "on" positions to be relatively projected for engagement in one direction to effect actuation of the ring, mounting plate and switch to the central "off" position and for engagement in the opposite direction to rotate freely with respect to the ring, mounting plate and switch without actuating the same.

9. A directional signal switch for automobiles and like vehicles comprising a housing mounted about the steering column of the vehicle and an electrical switch movable between a central "off" position and "on" positions at opposite sides of said "off" position; a pair of pins secured to said housing, said pins being disposed equally at opposite sides of a point diametrically opposite the "off" position of the electric switch, a ring mounted in engagement with said pins, means to selectively rotate said ring from a central "off" position to a right hand "on" position about one of said pins and to a left hand "on" position about the other of said pins, said ring in engagement with the electric switch operable to actuate said switch upon similar actuation of the ring, a mounting plate resiliently mounted on said ring, spring means operable normally to maintain said mounting plate in an inner limit position with respect to the ring, said mounting plate adapted to be displaced outwardly with respect to the ring upon the exertion of a predetermined force thereon, and a pair of cancelling elements rotatably carried by the mounting plate at respectively opposite sides thereof and arranged when the ring, mounting plate and switch are in either of said "on" positions to be relatively projected for engagement in one direction to effect actuation of the ring, mounting plate and switch to the central "off" position and for engagement in the opposite direction to rotate freely with respect to the ring, mounting plate and switch without actuating the same.

10. A directional signal switch for automobiles and like vehicles comprising a housing mounted about the steering column of the vehicle and an electrical switch including a member movable between a central "off" position and "on" positions at opposite sides of said "off" position; a pair of pins extending upwardly from the base of said housing, said pins being disposed equally at opposite sides of a point diametrically opposite the "off" position of the electric switch, an annular ring mounted in engagement with said pins, means to selectively rotate said annular ring from a central "off" position to a right hand "on" position about one of said pins and to a left hand "on" position about the other of said pins, guide means to direct rotary movement of the ring about said pins and to limit relative movement of the ring with respect to the pins, a compression spring engaged between said ring and the housing operable to resiliently maintain the ring in the "off" position and in the right and left hand limit positions, a bifurcated finger projecting downwardly from said ring in engagement with the electric switch operable to actuate said switch upon similar actuation of the ring, a mounting plate resiliently mounted on said ring, spring means operable normally to maintain said mounting plate in an inner limit position with respect to the ring, said mounting plate adapted to be displaced outwardly with respect to the ring upon the exertion of a predetermined force thereon, and a pair of cancelling elements rotatably carried by the mounting plate at respectively opposite sides thereof and arranged when the ring, mounting plate and switch are in either of said "on" positions to be relatively projected for engagement in one direction to effect actuation of the ring, mounting plate and switch to the central "off" position and for engagement in the opposite direction to rotate freely with respect to the ring, mounting plate and switch without actuating the same.

11. A directional signal switch for automobiles and like vehicles comprising an electric switch including a member movable between a central "off" position and "on" positions at opposite sides of the "off" position; a ring having a portion overlying the switch member and operatively connected thereto, means pivotally mounting said ring for rotary movement about pivots equally spaced at opposite sides of an imaginary center line through the "off" position of the electric switch, and means to manually pivot the ring selectively about the left hand pivot in a right hand direction and about the right hand pivot in a left hand direction to right and left hand "on" positions.

12. A directional signal switch for automobiles and like vehicles comprising an electric switch including a member movable between a central "off" position and "on" positions at opposite sides of the "off" position; a ring having a portion overlying the switch member and operatively connected thereto, means pivotally mounting said ring for rotary movement about pivots equally spaced at opposite sides of an imaginary center line through the "off" position of the electric switch, means to manually pivot the ring selectively about the left hand pivot in a right hand direction and about the right hand pivot in a left hand direction to right and left hand "on" positions, and an over-center spring interconnecting said ring with a stationary part of the structure, and positioned to hold said ring resiliently in its "off," "right hand on," and "left hand on" positions, respectively, when the ring is manually pivoted into one of said respective positions.

13. In an actuating mechanism for a directional signal switch for automobiles and like vehicles, the combination comprising an actuating arm extending laterally from a mounting adjacent the steering post, a signal actuating member extending arcuately about a substantial portion of said steering post and have an intermediate portion thereof secured to said arm and having portions extending in opposite directions from said connection to said arm in a plane substantially perpendicular to said steering post and adjacent thereto, pivotal supports for said actuating member spaced arcuately from each other about said post in opposite directions from said connection, means controlled by the pivotal movement of said actuating member for actuating a switch element to indicate right and left turns, respectively, in the extreme positions of said member, and means resiliently mounted upon said member for lost-motion free movement in one direction and positive impelling relationship to said member in the other direction, said actuating member being connected to one of said pivotal supports through a lost-motion connection permitting limited rotation about the other pivotal support in one direction and to the other pivotal support through a lost motion connection permitting limited rotation about said one support in the other direction, a projection from said steering post mounted in position to abut said resiliently mounted means in a direction to impart thereto said lost-motion free movement as said steering post rotates in a direction to make the turn indicated and to abut another portion of the same in the opposite direction of movement of said steering post to impart said impelling movement therethrough to said actuating member to cancel the signal, and means to hold said actuating member resiliently in said respective extreme signal-actuating positions and in an intermediate off position, upon actuation thereof to any one of said positions.

14. In an actuating mechanism for a directional signal switch for automobiles and like vehicles, the combination comprising an actuating arm extending laterally from a mounting adjacent the steering post, a signal actuating member having an intermediate portion thereof secured to said arm and having portions extending in opposite directions from said connection to said arm in a plane substantially perpendicular to said steering post and adjacent thereto, pivotal supports for said actuating member spaced arcuately from each other about said post in opposite directions from said connection, means controlled by the pivotal movement of said actuating member for actuating a switch element to indicate right and left turns, respectively, in the extreme positions of said member, and means resiliently mounted upon said member for lost-motion free movement in one direction and positive impelling relationship to said member in the other direction, said actuating member being connected to one of said pivotal supports through a pin and slot lost-motion connection permitting limited rotation about the other pivotal support in one direction and to the other pivotal support through a pin and slot lost-motion connection permitting limited rotation about said one support in the other direction, a projection from said steering post mounted in position to abut said resiliently mounted means in a direction to impart thereto said lost-motion free movement as said steering post rotates in a direction to make the turn indicated and to abut another portion of the same in the opposite direction of movement of said steering post to impart said impelling movement therethrough to said actuating member to cancel the signal, and means to hold said actuating member resiliently in said respective extreme signal-actuating positions and in an intermediate off position, upon actuation thereof to any one of said positions.

References Cited in the file of this patent

UNITED STATES PATENTS

| | | |
|---|---|---|
| 2,221,276 | Thirlwell | Nov. 12, 1940 |
| 2,249,120 | Doane | July 15, 1941 |
| 2,249,137 | Hill | July 15, 1941 |
| 2,269,499 | Wharam | Jan. 13, 1942 |
| 2,427,595 | Fuller | Sept. 16, 1947 |
| 2,525,033 | Hollins | Oct. 10, 1950 |
| 2,570,783 | Farley | Oct. 9, 1951 |
| 2,602,849 | Lawson et al. | July 8, 1952 |
| 2,643,308 | Lincoln et al. | June 23, 1953 |
| 2,657,287 | Lincoln et al. | Oct. 27, 1953 |